Figure 1:
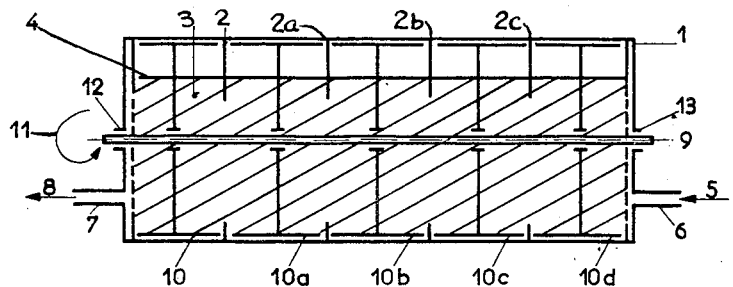

Oct. 23, 1962        M. HELLIN ETAL              3,060,240
      METHOD FOR PRODUCING ISOPRENE AND FORMALDEHYDE
                FROM 4,4-DIMETHYLMETADIOXANE
Filed Sept. 28, 1959                    4 Sheets-Sheet 1

INVENTORS
MICHEL HELLIN
FERNAND COUSSEMANT
DANIEL LUMBROSO
JEAN-PIERRE SERVAUD
BY Toulmin & Toulmin
ATTORNEYS Oct. 23, 1962
M. HELLIN ETAL
3,060,240
METHOD FOR PRODUCING ISOPRENE AND FORMALDEHYDE
FROM 4,4-DIMETHYLMETADIOXANE
Filed Sept. 28, 1959
4 Sheets-Sheet 2
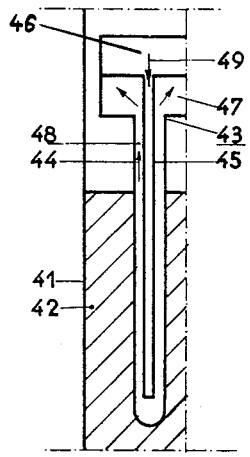
FIG. 4
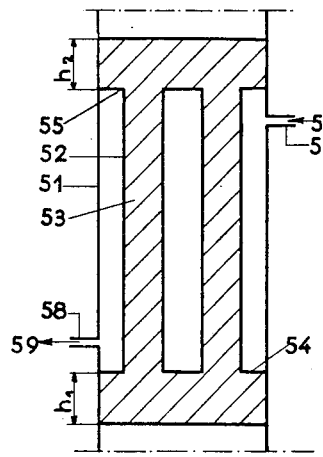
FIG. 5
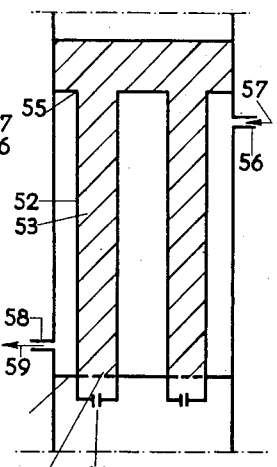
FIG. 5a
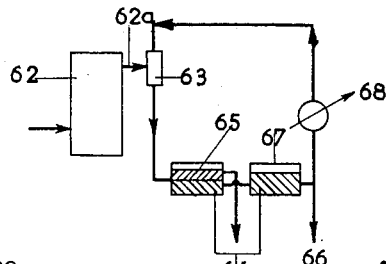
FIG. 6
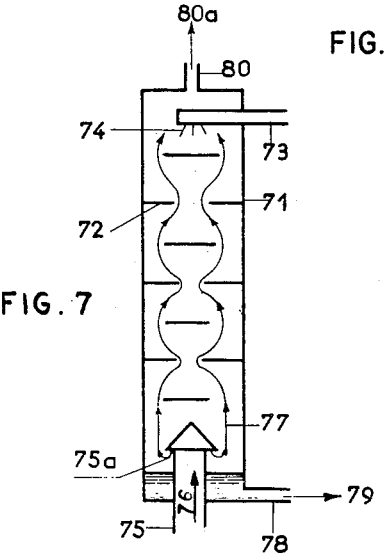
FIG. 7
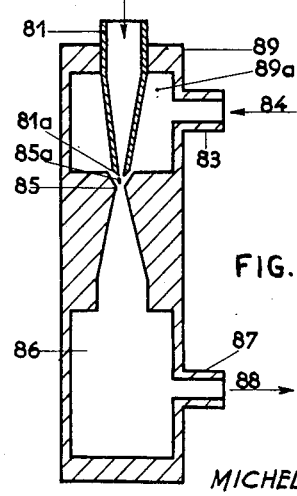
FIG. 8
INVENTORS
MICHEL HELLIN
FERNAND COUSSEMANT
DANIEL LUMBROSO
JEAN-PIERRE SERVAUD
BY 
ATTORNEYS Oct. 23, 1962 M. HELLIN ETAL 3,060,240
METHOD FOR PRODUCING ISOPRENE AND FORMALDEHYDE
FROM 4,4-DIMETHYLMETADIOXANE
Filed Sept. 28, 1959 4 Sheets-Sheet 3

INVENTORS
MICHEL HELLIN
FERNAND COUSSEMANT
DANIEL LUMBROSO
JEAN-PIERRE SERVAUD
BY Toulmin & Toulmin
ATTORNEYS

INVENTORS
MICHEL HELLIN
FERNAND COUSSEMANT
DANIEL LUMBROSO
JEAN-PIERRE SERVAUD

United States Patent Office 3,060,240
Patented Oct. 23, 1962

3,060,240
METHOD FOR PRODUCING ISOPRENE AND FORMALDEHYDE FROM 4.4-DIMETHYLMETA-DIOXANE
Michel Hellin, Rueil Malmaison, Fernand Coussemant, Paris, Daniel Lumbroso, Le Vesinet, and Jean-Pierre Servaud, Paris, France, assignors to Institut Francais du Petrole des Carburants et Lubrifiants, Paris, France
Filed Sept. 28, 1959, Ser. No. 842,995
Claims priority, application France Sept. 29, 1958
4 Claims. (Cl. 260—606)

The present invention relates to a method for producing isoprene. More in particular, the present invention relates to a method for producing isoprene by catalytic decomposition of 4.4-dimethylmetadioxane.

Until very shortly 4.4-dimethylmetadioxane was a very costly product and it was, therefore, not used for the production of isoprene on an industrial scale. As of recently, however, a method has been found to produce 4.4-dimethylmetadioxane in a much more economical manner. This method is disclosed in our co-pending applications Serial Number 722,848 filed March 3, 1958 and now Patent No. 2,962,507, Serial Number 797,275 filed March 4, 1959 and now Patent No. 2,997,480 and Serial Number 830,033 filed July 28, 1959 and now abandoned.

Since this method has been found, the production of isoprene on the basis of 4.4-dimethylmetadioxane has become quite interesting and of economic importance. In order to render such a process economical and profitable it is, however, necessary to obtain a good yield of the final product. With other words, the final yield of isoprene as well as of formaldehyde, which latter is also obtained, is comparatively high with respect to the basic product, that is the 4.4-dimethylmetadioxane. This effect can only be achieved if it is possible to limit the secondary reactions whereby 4.4-dimethylmetadioxane is converted to isobutane, 3-methylbutane-1.3-diol and heavier products; furthermore, it is necessary to limit the re-sinification of the isoprene and the formaldehyde, which results in the deposition of carbon on the catalyst, which latter has to be regenerated very frequently.

The known processes for producing isoprene from 4.4-dimethylmetadioxane do not meet these requirements. The industrial application of the known methods is far from profitable since the selectivity of these known processes is very poor. By selectivity we understand that quality of the reaction process which makes it possible to obtain a good yield of isoprene with respect to the quantity of converted 4.4-dimethylmetadioxane.

In the known methods causing a reaction of 4.4-di-methylmetadioxane in the liquid phase, the selectivity of the reaction is rather poor. In addition, the process is difficult to carry out since no satisfactory solution has been found of the problem of how to assure a satisfactory contact between the catalyst and the 4.4-dimethyl-metadioxane and, at the same time, to remove rapidly the products of the reaction in order to avoid their deterioration and decomposition.

It has already been proposed to effect the reaction in the vapor phase. However, in these methods the catalysts are poor and inefficient. Particularly the selectivity of the catalysts is insufficient to accomplish the optimal rate of transformation and to assure an ecomonical and profitable industrial production of the isoprene.

It is, therefore, an object of the present invention to provide a method for producing isoprene by catalytic decomposition of 4.4-dimethylmetadioxane which is much more economical than any of the known processes and which makes it possible to produce isoprene from 4.4-dimethylmetadioxane efficiently and profitably on an industrial scale.

It is another object of the present invention to provide a method for producing isoprene by catalytic decomposition of 4.4-dimethylmetadioxane which has a high conversion rate, a high selectivity and a high yield of isoprene and formaldehyde.

It is a further object of the present invention to provide a method for producing isoprene by catalytic decomposition of 4.4-dimethylmetadioxane, in which high losses of formaldehyde and isoprene are avoided and the resinification and decomposition of isoprene and formaldehyde are greatly reduced.

It is still another object of the present invention to provide a method for producing isoprene by catalytic decomposition of 4.4-dimethylmetadioxane, as well as a catalyst for this method, which catalyst has a great mechanical and thermic resistance, can be easily regenerated and has a very long service life.

These objects as well as further objects and advantages of the invention which will become apparent as the detailed description thereof proceeds, are achieved by the method of the present invention whereby isoprene can be profitably produced on an industrial scale by the catalytic decomposition of 4.4-dimethylmetadioxane according to the following reaction:

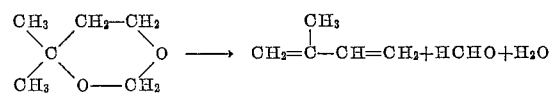

According to the method of the present invention the 4.4-dimethylmetadioxane is passed in the vapor phase over a catalytic agent consisting of a glass wool having a small specific surface, which glass wool has previously been impregnated with a predetermined quantity of phosphoric acid. In carrying out this process a number of further conditions have to be observed which will be described further below. The method of the invention comprises the following basic steps: A catalyst is prepared by impregnating a glass wool having a small specific surface with a predetermined quantity of phosphoric acid and in a manner described in further detail below.

4.4-dimethylmetadioxane is then passed in the vapor phase over this catalytic agent, preferably after having been diluted with inert gases or vapors, such as paraffinic or naphthenic hydrocarbons or a hydrocarbon mixture as obtained by the reaction process for making 4.4-dimethyl-metadioxane, described in the co-pending applications, supra, or with steam.

The gaseous mixture is then tapped from the reaction vessel and is fractionated by fractional distillation or by selective extraction with a solvent such as a paraffinic or naphthenic hydrocarbon or a mixture of both.

The invention also provides for a method for regenerating the catalytic agent after is has been used for some time, in order to regain its initial efficiency.

Describing now the invention in greater detail and turning to the first basic step, a catalyst is prepared which is composed of a glass-wool having a small specific surface and which is then impregnated with phosphoric acid. By small specific surface we wish to be understood a specific surface which is not greater than 100 m.² per gram and which is preferably less than 20 m.² per gram. The specific surface can be measured for example with the apparatus described by "Bruneauer, Emmett et Teller, J. Am. Chem. Soc. 60, 309, 1938."

The term "glass wool" as used herein designates every kind of silicates which are in the form of fibers, either naturals or synthetics. Accordingly natural fibrous silicates such as those silicates known as asbestos may be used as well as synthetic glass fibers as a catalytic support material according to the present invention. For sake of brevity the term glass wool is therefore used throughout this specification to represent any form of fibrous silicates.

It has been found that glass wool is particularly advantageous as a catalyst support, because of its excellent physical properties and its remarkable catalytic properties, if processed according to the invention and impregnated with phosphoric acid.

This result is entirely unexpected and surprising. Glass wool does not have any catalytic activity per se furthering the decomposition of 4.4-dimethylmetadioxane. However when treated in the manner to be presently described and impregnated with phosphoric acid, glass wool provides for a far better selectivity of 4.4-dimethylmetadioxane in the vapor phase than that obtained by using phosphoric acid in the liquid phase without the glass wool support or by using an active catalyst support such as the sillico-alumina.

The highly unsatisfactory yield of isoprene obtained with silicoalumina as a catalyst is illustrated by the following example:

A mixture of 900 grams of 4.4-dimethylmetadioxane and 910 grams of water is passed through a catalytic bed composed of 304 grams of synthetic silicoalumina. The speed with which the 4.4-dimethylmetadioxane and the water are injected into the reaction vessel is 0.12 liters/hour. As a result of the reaction there are obtained only 81.2 grams of isoprene, 150 grams of isobutene, 32.8 grams of pentenes, 58 grams of formaldehyde and 305 grams of non-converted 4.4-dimethylmetadioxane. The deposits on the catalyst are as high as 120 grams. The weight of the thus obtained isoprene represents a molar yield of only 23.3% with respect to the converted 4.4-dimethylmetadioxane.

This example shows that the use of silicoalumina does not assure a selective decomposition of 4.4-dimethyl-metadioxane so as to obtain isoprene; in addition, the yield of formaldehyde is very poor.

According to the invention the catalyst is prepared by using the silicate support material, and preferably glass wool in the aforementioned specific surface ranges, as a support material which is then impregnated with a predetermined relative amount of phosphoric acid. The phosphoric acid content of the impregnated glass wool can be expressed, for example, in a certain percentage by weight of phosphoric acid with reference to the weight of the impregnated support material.

The impregnation must be so controlled that this percentage is within determined limits, because both a percentage which is too small and a percentage which is too high is disadvantageous and does not permit to obtain most profitable results of the method of the invention. If the percentage of the phosphoric acid is too small the conversion rate of 4.4-dimethylmetadioxane and of isoprene are very poor and the process is not profitable. On the other hand if the support contains too much acid, the catalyst favours secondary reactions and carbonization effects without raising the conversion rate sufficiently to compensate for the secondary reaction losses. We have found that optimal results are obtained if the glass wool is impregnated with an amount of phosphoric acid in the range of from 5 to 60% by weight. Preferably the acid content of the glass wool support is from 25 to 35% by weight. It is to be understood that these percentages relate to the total end weight of the impregnated support material after drying.

The silicate or preferably glass wool support is impregnated with phosphoric acids, for example by preparing an aqueous solution of phosphoric acid having a concentration depending on the desired acid content of the catalyst. The support material is then immersed in this aqueous solution which can be done at normal atmospheric pressure or in vacuum. Thereafter the thus impregnated material is dried in a dryer at a temperature of from 120 to 700° C. for a period of e.g. 2 to 20 hours. At a temperature of about 280° C. the drying takes e.g. about 10 hours. The duration of the drying process is inversely related to the degree of temperature used.

Any other way of bringing the support in contact with the impregnated agent may be used, as for example passing liquid impregnating agent through the support material or by contacting the support with impregnating agent in a finely dispersed state of the latter.

After having thus prepared a catalyst the reaction process can be carried out with the use of this catalyst. The 4.4-dimethylmetadioxane is passed over this catalyst at a temperature, a pressure, and a spatial speed which will next be explained separately in detail.

The temperatures at which the 4.4-dimethylmetadioxane is passed over the catalyst at a given spatial speed should be higher than 200° C. at atmospheric pressure. According to the invention, the preferred temperature range is between 250° and 280° C. It is absolutely necessary to avoid temperatures above 300° C., because at higher temperatures the formaldehyde will decompose. We have found that at a temperature of, for example, 270° C., which is in the aforementioned temperature range, the yield of formaldehyde is 90% of the theoretical yield whereas it drops to less than 50% if the temperature rises above 300° C., ceteris paribus.

Turning now to the pressure during the reaction, it may be advantageous to operate at a reduced pressure in view of reducing deposits of carbon on the catalyst, however, in practice it is most expedient to operate under normal atmospheric pressure. It may be also interesting in some cases to operate at higher pressures, for example up to about 5 kilograms per cm.$^2$, since in that case higher spatial speeds can be applied while using an apparatus of the same volume.

The 4.4-dimethylmetadioxane is passed in the vapor phase through the catalytic bed at the spatial speed which is determined according to the desired rate of conversion. The latter can be increased by diminishing correspondingly the spatial speed of the 4.4-dimethylmetadioxane.

As a general rule it is preferable to limit the transformation rate to a value which is less than 90% and preferably in the range of 60% of the 4.4-dimethylmetadioxane passed over the catalyst, in order to reduce the resinification of isoprene and of formaldehyde. This resinification is particularly disadvantageous because it not only reduces the yield of isoprene and formaldehyde but at the same time lowers the activity of the catalyst. It is therefore justified to voluntarily limit the conversion rate, particularly in view of the fact that this does not prejudice the optimal yield as the process is a continuous one, and the final yields of isoprene and formaldehyde with respect to the 4.4-dimethylmetadioxane can still be very high by refeeding the 4.4-dimethylmetadioxane which has not been converted into the reaction vessel.

The rate of conversion can be limited, for example, by lowering the temperature in the reaction vessel, or by increasing the spatial speed of the 4.4-dimethylmetadioxane in the reaction vessel, thereby reducing the time during which the mixture is in contact with the catalyst.

It is also of advantage to limit the spatial speed of the 4.4-dimethylmetadioxane through the catalyst to such a value that substantially phosphoric acid is taken along. It has been found as a general rule that a spatial speed of the 4.4-dimethylmetadioxane with respect to the catalyst in the range of from 0.2 to 2 liters per hour and per liter of catalyst is preferred and results in a conversion rate in the range from 30 to 80%.

We have also found that the resinification of the isoprene can be further reduced by diluting the 4.4-dimethyl-metadioxane with inert gases or vapors, such as, for example, nitrogen, steam or paraffinic or naphthenic hydrocarbons or mixtures thereof, which can be easily separated from the isoprene by fractional distillation such as, for example, the hydrocarbon mixtures obtained from the units producing 4.4-dimethylmetadioxane from a cracking C$_4$ cut containing isobutene.

The rate of conversion as conditioned on a particular catalyst, a given temperature and a given spatial speed of the 4.4-dimethylmetadioxane is not substantially changed by the addition of the aforementioned inert vapors or gases with which the 4.4-dimethylmetadioxane is diluted.

On the other hand, an excessive dilution should be avoided as this would absorb a substantial amount of heat, thereby rendering the process much more expensive. As a practical compromise we have found that if, for example, steam is used as a diluting agent, the molar proportion of the water with respect to the total feed charge is in the range of from 30–95%.

After the 4.4-dimethylmetadioxanne has thus been passed through the catalyst after the reaction has taken place converting a given percentage of the 4.4-dimethylmetadioxane, the gaseous mixture is tapped from the reaction vessel and is separated. This separation can be effected either by fractional distillation or by selective extraction by adding a solvent.

By this separation, isobutene, isoprene and the aqueous solution of formaldehyde as well as high molecular condensation products are obtained. In addition, a small portion of 4.4-dimethylmetadioxane is obtained which has not reacted and which is re-introduced into the reaction vessel.

Turning first to the separation by fractional distillation, this can be carried out advantageously in the following manner: The vapors tapped from the reaction vessel are condensed and the liquid obtained is then fed into a separator. The upper layer of the liquid constitutes the organic phase and is fed into a distillation unit, such as a fractionation column, where it is distilled and the various products are separately collected, which are isoprene, traces of isobutene, 4.4-dimethylmetadioxane which has not reacted and which is re-introduced into the reaction vessel for further processing, as well as a small quantity of residual substances having a higher molecular weight than isoprene. The aqueous phase forming the lower portion of the liquid in the separator is introduced into a second fractionation column at the head of which there is obtained an azeotropic mixture of 4.4-dimethylmetadioxane and water, which is then condensed and wherefrom there is separated by simple decantation the major portion of the 4.4-dimethylmetadioxane which is then re-fed into the reaction vessel, whereas the aqueous portion, which still contains a small amount of 4.4-dimethylmetadioxane in solution, is re-fed into the fractionation column. At the bottom of this column there is collected a diluted aqueous solution of formaldehyde which can be concentrated, for example, by concentration under super-atmospheric pressure and which is then re-fed into unit producing 4.4-dimethylmetadioxane, from isobutene, working according to the process described in the co-pending applications, supra.

Instead of separating the isoprene and the isobutene by fractional distillation it is also possible to proceed by selective extraction. This is done by adding inert solvents which can be easily separated by distillation. As a solvent it has been found to be of advantage to use hydrocarbons or mixtures thereof, particularly paraffinic or naphthenic hydrocarbons or mixtures thereof having at least four carbon atoms and which are easily separable from the isoprene by distillation. The gaseous mixture tapped from the reaction vessel is extracted by adding such as a solvent, whereby an organic solution is obtained. The various substances obtained from this distillation are consisting of isoprene, traces of isobutene, the solvent of 4.4-dimethylmetadioxane, which latter is re-fed into the reaction vessel.

The aqueous phase containing the formaldehyde may be concentrated under pressure and can then be used as one of the basic materials in the process for the manufacture of the 4.4-dimethylmetadioxane described in the co-pending applications, supra.

The use of the catalyst according to the method of the invention and generally the process of the invention results in a highly profitable production. By using the method of the invention, molecular yields are obtained which are in the range of about 90% isoprene and 95% formaldehyde with respect to the converted 4.4-dimethylmetadioxane, whereas the yield of isobutene does not exceed 5%.

The catalyst prepared as described above and used for converting 4.4-dimethylmetadioxane can be used for a considerable time of operation and thus is highly economical.

In addition, it can be re-generated after its catalytic effect has shown some deterioration and can then be re-used in the process of the invention. The re-generation of the catalyst is effected by reimpregnating the same with phosphoric acid in the same manner as the initial impregnation.

This re-impregnation can be repeated for several times, although not indefinitely, because the reimpregnation does not remove the deposits on the catalysts, which, in the long run would greatly reduce their catalytic activity. According to the invention it is, therefore, suggested to eliminate these deposits periodically after a number of successive re-impregnations, for example by burning the catalyst in air or oxygen at a temperature in the range of from 400 to 500° C. for several hours. After having done this, the catalyst is re-impregnated with phosphoric acid and can be used for a considerable time and can be repeatedly reimpregnated.

Although excellent results are thus obtained by using the method described heretofore, we have found that by taking additional steps and precautions the results obtained by the invention can be further improved by the preferred embodiment of the method of the present invention which is preferably carried out with the apparatus described below.

According to a preferred embodiment of the invention the catalytic particles of the afore-described type are displaced relative to one another during the process of reaction. This displacement can be effected either periodically or permanently.

If the catalytic particles are displaced periodically rather than constantly the intervals between each period of relative displacement of the particles should not be too great. We have found that an interval of about 3 to 5 hours is the maximal allowable interval between two successive relative displacements of particles. It is, however, very well possible to make this interval shorter.

Preferably, this displacement is effected continuously since it results in a most even catalytic effect. If the displacement is effected periodically rather than permanently it must be more efficient. The longer the intervals between two successive displacements, the more vigorously and efficiently each operation of displacement must be carried out.

The displacement can be effected mechanically. According to the present invention it can be effected by passing a stream of gas containing the 4.4-dimethylmetadioxane in the vapor phase through the catalytic agent, thereby bringing the substance to be converted into contact with the catalyst and at the same time displacing particles of the latter, thereby attaining a more efficient, speedier and more productive reaction. The gas stream can be passed through the catalyst at various speeds. If the speed is comparatively moderate the catalyst particles are simply displaced with respect to each other so as to obtain what may be called an expanding bed of catalytic material. If the gas stream is passed through the catalyst at a comparatively high speed the catalytic particles are so quickly taken along by the gas stream that they are virtually suspended therein, thereby obtaining what may be called a fluid bed of the catalyst.

The displacement becomes more effective in direct proportion to an increase of the speed of the gas stream, up to and including the limit where the high speed of the gas stream keeps the grains of the catalyst in suspension.

We have found that a speed resulting in an expanding bed is generally sufficient for obtaining good results and it is not absolutely necessary to increase the speed up to the point where the catalyst forms a fluid bed.

In order to effect this last-mentioned method of displacement, that is constituting a fluid bed of the catalytic particles by passing the gas stream of the reactants therethrough, the particles of the catalytic agent must be significantly smaller than in case the catalytic particles are used in the form of a fixed bed. We have found that the particles must have a size within very strict limits which are approximately in the range from 20 microns to 1 millimeter, and preferably between 50 and 500 microns. These ranges are not to be considered as exclusive and are subject to variations depending primarily on the speed of the gas stream. Preferably, the highest speeds are associated with the largest particles of a catalyst, and vice versa.

According to a further embodiment of the method of the invention, heat is supplied to the catalyst and to the gas in the interior of the reaction vessel.

The reaction converting the 4.4-dimethylmetadioxane is highly endothermic and for that reason heat must be supplied. It would be obvious to supply this heat by heating the gas prior to its introduction into the reaction vessel, thereby providing for the necessary heat required by the reaction therein. However, we have found that it would be greatly disadvantageous to do that in as much as it would severely limit the rate of conversion and would result in a very poor yield of isoprene and formaldehyde. As a matter of fact, the gases fed into the reaction vessel have a comparatively low specific heat and therefore it is necessary to overheat them very strongly in order to provide for the necessary heat required by the reaction. Since parasitic reactions develop very rapidly starting from a certain temperature which is in the range of about 300° C., a notable reduction of the yield of isoprene and formaldehyde would be the result of such a preliminary over-heating. According to the present invention it has been found to be advantageous to supply the heat requirements in the interior of the reaction vessel itself and to maintain the catalytic material within the reaction vessel at a substantially homogeneous temperature. Furthermore, the heat is very evenly distributed in order to prevent local over-heating of any portion of the catalytic mass. This can be done in the most efficient manner by disposing a large heat-exchanging surface within the interior of the catalytic mass.

According to still a further embodiment of the method of the invention the gases leaving the reaction vessel are rapidly cooled. We have found that such a rapid and efficient cooling of the gases further increases the yield of the reaction. In addition, such a process avoids the formation of solid substances which could disturb the circulation of the products of the reaction, for example by blocking the sealing means, polluting the heat exchangers, etc.

The gases must be chilled as rapidly as possible in order to lower their temperature from the reaction temperature, which latter is up to about 300° C. down to a temperature in the range from 20 to 80° C. in the shortest possible time.

The above-described method of regenerating the catalyst is also further improved by the following modifications: The regeneration can be effected either periodically or preferably continuously.

It can be done continuously, for example, where the catalyst forms a fixed bed in which case the catalytic mass is regenerated in its entirety, by burning the deposits and/or reimpregnating the same with the phosphoric acid. The regenerating of the entire catalyst does in no way prejudice the continuous operation of the reaction process since two reaction vessels can be provided, one of which is in operation whereas the other is taken out of operation for regenerating the catalyst therein.

The same periodical regeneration can be effected where the catalyst forms a mobile or fluid bed. According to a preferred embodiment of the method of the invention this is, however, done continuously. According to this part of the method of the invention the circulation of the catalyst is used for effecting a continuous burning of the deposits thereon and a subsequent reimpregnation in a unit separate from the reaction vessel. This method is particularly useful where the catalyst forms a fluid bed since a very smooth and entirely continuous operation is thus obtained.

The afore-mentioned steps can be taken both for removing the deposits on the catalyst and for impregnating the catalyst with phosphoric acid, although the first-mentioned operation does not have to be carried out as frequently as the reimpregnation but only once for a number of reimpregnations, which number is in the order of about two to ten.

The burning of the deposits is preferably carried out by an oxygen current or a gas mixture containing oxygen as, for example, air, which is heated to a temperature in the range from 300° to 600° C., the highest temperature being preferably used with gas mixture having the lowest oxygen content and vice versa.

As has been described further above, the reimpregnation of the catalyst with phosphoric acid can be done by immersing the latter into a solution of phosphoric acid having a concentration, for example, from 10 to 85% by weight, and then drying the catalyst in order to remove the water content. However, according to a preferred embodiment of the method of the invention, very fine droplets of an aqueous solution of phosphoric acid of suitable concentration, for example, in the range from 10 to 85% by weight, are passed through the catalytic mass of material, which latter is preferably in the form of a fluid mass.

It is absolutely necessary to effect the reimpregnation of the catalyst in the absence of the reactants and the reaction product. Also, a direct injection of the phosphoric acid into the reactants and products of the reaction must be carefully avoided. It is, however, possible to effect the reimpregnation into a unit connected with the reaction vessel. In that case and according to the preferred method of the invention a part of the steam to be introduced into the reaction vessel is used for maintaining that fraction of the catalytic particles which has to be reimpregnated into suspension. The phosphoric acid having a concentration in the afore-mentioned range is then injected either into the fluid catalyst itself or into the steam current for maintaining the catalyst in suspension. The process of suspending the catalytic particles in the form of a fluid bed is equivalent to an excellent displacement and thereby a particularly homogeneous penetration of the acid throughout the catalytic mass is obtained. In addition, the phosphoric vapor is only in contact with the steam and the catalyst, but not with the reactants, and the charging of the reaction vessel with 4.4-dimethylmetadioxane and additional steam can be effected in the absence of any vapors of phosphoric acid.

If the regeneration unit is thus connected with the reaction vessel it is advantageous to carry out the regeneration at the same temperature which is used for the reaction, as this procedure will avoid any loss of heat in the entire system.

The aforementioned steps in the preferred embodiment of the method of the invention are highly advantageous and result in a process of a great profitability and efficiency.

We have found that a thorough displacement of the catalytic particles relative to one another has, in some instances, doubled the rate of conversion and thereby makes it possible to substantially increase the production of isoprene as compared with that obtained by the described embodiment of the method of the invention without displacement. In addition, the activity of the catalyst is greatly prolonged compared with the activity in the method of the invention in which the catalyst forms a fixed bed.

These results are entirely unexpected because heretofore only regeneration methods such as calcination, reimpregnation or other chemical rather than purely mechanical processes brought about such results. The following may constitute an explanation for this: If the catalyst forms a fixed bed, channel outlets are formed therein after a certain time of operation through which the stream of gas of the reactants is allowed to pass preferentially. These passages, which can be caused by a displacement of the grains of the catalyst or by deposits, put a major part of the catalyst out of action. A periodical and preferably permanent displacement of the catalyst destroys these passages and thereby the entire mass of the catalyst participates in the reaction.

This explanation should be regarded as merely an attempt not limiting the invention in any way.

The furnishing of heat to the reactants in the reaction vessel itself rather than prior to their introduction into the latter makes it unnecessary to over-heat the charge beyond the temperature range, at which secondary parasitic reactions set in, which would greatly diminish the yield of isoprene and formaldehyde.

The abrupt chilling of the gaseous products leaving the reaction vessel also greatly increases the yield and, in addition, keeps the reaction vessel clean and prevents any disturbance of the circulation of the products therein.

The present invention also provides apparatus with which the method of the invention can be for example advantageously carried out. These apparatus are shown in the accompanying drawings, wherein, FIGURE 1 illustrates, by way of an example, such an apparatus for agitating the catalytic mass, substantially comprising a horizontal catalytic chamber having a plurality of baffle plates and a rotating shaft with a plurality of drums rotating in the axis of the reaction vessel, and wherein an empty space is left in the upper portion of the reaction vessel in order to allow the catalytic particles to fall back into the reaction vessel.

As shown by way of an example in FIGURE 1, the horizontally disposed reaction vessel 1 which is stationary, is provided with a plurality of baffle plates 2, 2a, 2b, 2c and is filled with catalyst 3 up to the level 4. Through catalyst 3 passes the gas stream, entering, as indicated by arrow 5, through inlet channel 6 and leaving the vessel 1 through outlet channel 7 as indicated by arrow 8. The agitator is composed of a shaft 9 projecting from the reaction vessel 1 through openings 12 and 13, and bearing a plurality of drums 10; 10a, 10b, 10c, 10d. The shaft 9 with the drums rotates slowly, for example, in the sense of arrow 11, at a rate of 5 to 20 revolutions per hour. Thereby the grains constituting the catalytic mass are periodically displaced with respect to each other.

Figure 2:
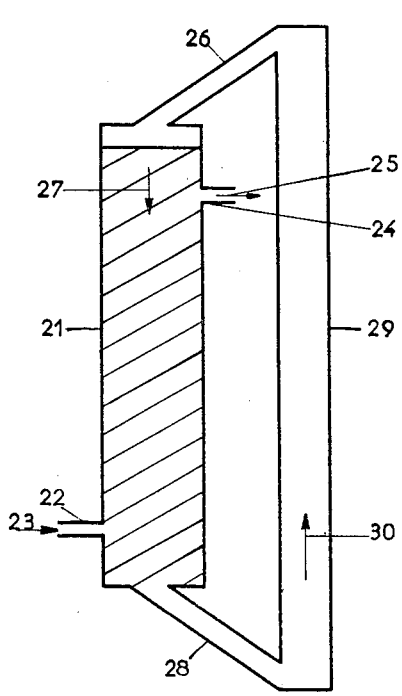

It is also possible to provide an apparatus having a vertical reactor and wherein the catalyst is continued circulated, thus forming a mobile bed. The catalyst is tapped at the lower end of the reaction vessel and it is re-entered at its upper end. Such an apparatus is shown, for example, in FIGURE 2. The reaction substances are fed into the catalytic chamber 21 through inlet 22, as indicated by arrow 23, and the reaction products leave the chamber 21 through outlet 24, as indicated by arrow 25. The catalyst circulates and travels through the chamber 21 downwardly in the direction of arrow 27 after having entered through channel 26. It then leaves through channel 28. The amount of the catalyst leaving the chamber is controlled by known mechanical means such as an Archimedes' screw or a movable grid which are conventional and therefor not shown in the drawing. It is then lifted in the column 29 in the direction of arrow 30 by such conventional means as, for example, a chain of buckets or a high speed gas stream. After having thus lifted in the column 29, the catalyst is refed into the reaction chamber 21 through channel 26.

Figure 3:
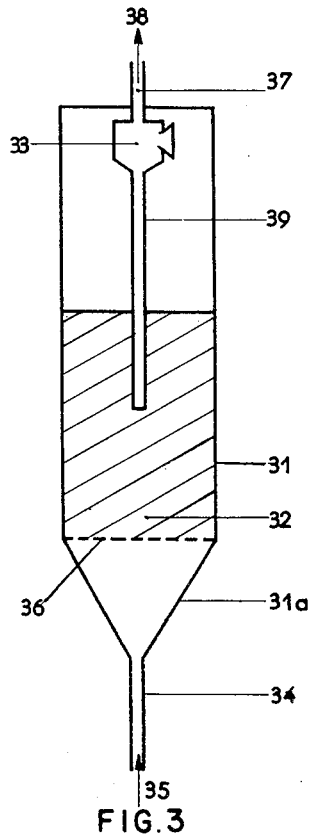

Another apparatus is provided for effecting a continuous agitation by the gas current containing the reaction substances themselves and which is shown, for example, in FIGURE 3. The reaction vessel 31 contains the catalyst 32 in its lower portion maintained by the distribution grid 36 and has at its lowermost end a conically shaped portion 31a, ending in an inlet channel 34. In the upper portion of vessel 31 there is provided a cyclone 33 having at its upper end an outlet channel 37 and at its lower end a tube 39 projecting into the catalyst 32.

The gas stream is fed into the reaction vessel through channel 34, as indicated by arrow 35, passed through distribution grid 36 and penetrates the catalyst 32, and then enters the cyclone 33. The gas stream then leaves the reaction vessel through channel 37, as indicated by arrow 38. The cyclone 33 prevents particles of the catalyst to be taken along by the stream of gas by separating the fine particles therefrom, which then fall by their proper gravity through the tube 39 back to the catalytic mass 32.

The invention provides also means for heating the catalyst and the gas within the interior of the reaction vessel. This can be done by conventional means such as, for example, heat exchange coils which are spirally or helically shaped in the interior of the reaction vessel through which coils there is passed a hot liquid or vapour, or electrical heating wires can be provided in the coils. These conventional means are primarily used in a horizontal reaction vessel.

Preferably, and according to the invention, an internal heat exchange is effected by the apparatus shown, for example, in FIGURE 4, comprising a plurality of tubes disposed within the reaction vessel.

A plurality of tubes such as, for example, the tubes 43, are provided in the reaction vessel 41, in contact with the catalyst 42 and comprise internal tubes such as 45. The tubes 43 are projecting vertically into the reaction vessel and are disposed parallel relative to each other. At the upper end of external tube 43 there is provided a return chamber 47 and, above the same, a distribution chamber 46. The internal tube 45 projects through return chamber 47 and opens into distribution chamber 46.

The hot fluid is fed from the distribution chamber 46 downwardly, as indicated by the arrow 49, through the internal tube 45. It then rises back up to the return box 47 through the annular free space 48 formed between tubes 43 and 45 (arrow 44), during which latter travel it exchanges its heat to the catalytic mass 42. The reaction gas can be passed through the catalytic mass either upwardly or downwardly.

It is also possible to provide an apparatus wherein the catalyst is disposed in the interior of, as shown for example in FIGURE 5. Within the reaction vessel 51 there are disposed a plurality of tubes, such as 52, having at their respective upper ends a tube builder plate 55, and at the respective lower ends a tube builder plate 54. The catalyst 53 is provided in the tubes 52 as well as over and below the plates 54 and 55 on respective heights $h_1$ and $h_2$ so that the volume of the catalyst is greater than the volume of the tubes 52. The heat exchange agent may consist of condensing vapor or a hot liquid circulating about the tubes 52 and which is supplied through channel 56, as indicated by arrow 57, and leaves through channel 58, as indicated by arrow 59. The reaction gas can be passed through the catalytic mass either upwardly or downwardly.

This apparatus is particularly useful where the catalyst forms a mobile or a fluid bed.

Another type of apparatus is provided for getting an excellent fluid bed of the catalyst by injecting the gas at the basis of each tube and controlling the dosage which is injected as carefully as possible. In this case the catalyst cannot fill up the lower portion of the reaction vessel below the tube builder plate 54. As shown in FIGURE 5a, there is provided a distribution grid 60 above which there is provided the catalyst 53. Carefully calibrated adjusting means 61 are disposed at the bottom of each tube 52 and below grid 60, which causes a loss of charge material, which is substantially above that caused by the passage of the gas through the fluid catalytic mass. A layer of fluid catalyst is maintained above the upper tube builder plate 55 which has the advantage of automatically controlling the height of the catalyst over each grid and to allow for the circulation of the catalyst particles from one tube to the other.

The invention further provides means of abruptly and rapidly chilling the gases leaving the reaction vessel. This chilling can be carried out with conventional means, such as external circulation cooling means with a liquid cooling agent, which can be equipped with cooling baffles, perforations, coils, tubes and other devices for increasing the cooling surface. Preferably, however, the chilling is effected by means of the apparatus of the type, as shown schematically in FIGURE 6.

According to this cooling system, the gases and vapors leaving the reaction vessel 62 as at 62a are passed into the contact chamber 63 where they are intimately mixed with a refrigerated liquid, preferably consisting of the aqueous phase of the condensed reaction substances 64. This aqueous phase is separated from the organic phase 65 by decantation and is then cooled by the cooling means 68, after the fraction corresponding to its production in the reaction vessel 62 has been removed through channel 66, for which the storage container 67 is used. Thereafter, the aqueous phase is refed into the contact chamber 63 at an elevated rate.

This cooling system offers a particularly advantageous chilling method since it makes it possible to have a direct cooling contact between the gas and the liquid phase, instead of an indirect heat exchange transmitted through tubes and the like, without having losses of the reaction products or the non-transformed reaction substances by dissolution in the liquid. This latter danger is avoided since the liquid phase is already saturated with reaction products and travels through a closed circuit. Of course, it would be possible to use water as a cooling liquid, however, this would then call for the additional step of separating the water and the products dissolved therein.

Two particular embodiments can be advantageously used in the above cooling system. As shown in FIGURE 7, there is provided a contact column 71 of the scrubber type. At its upper end it has an outlet channel 80 and at its lower end an outlet channel 78. In the upper portion there is also introduced into the column an inlet channel 73 having perforations 74. At its lowermost end there is introduced an inlet channel 75 having a distribution head 75a.

The cool aqueous phase is introduced through channel 73 and finally sprayed through perforations 74. The gas is introduced into the column through channel 75, as indicated by arrow 76 and distributed through the distribution head 75a at the basis of column 71. The contact between the aqueous phase and the gas is thus effected countercurrently and the aqueous phase takes along all condensed products. It then leaves the column through channel 78, as indicated by arrow 79, whereas the cold non-condensed gases leave the column through outlet 80, as indicated by arrow 80a.

According to a modification, means are provided for effecting the mixing by passing the aqueous solution through a nozzle. As shown in FIGURE 8, there is provided a channel 81 having a conical portion ending in a nozzle 81a and projecting into vessel 89 through a chamber 89a. An inlet channel 83 leads to this chamber 89a, which at its lower end communicates with a venturi passage 85 at the uppermost neck portion 85a, which is in the immediate vicinity of nozzle 81a. The lowermost end of the venturi passage communicates with chamber 86 having an outlet channel 87.

The aqueous solution is fed through channel 81, as indicated by arrow 82, and injected through nozzle 81a. The gases are drawn in through inlet channel 83 in the direction of arrow 84 and pass into chamber 89a. The two phases come into contact at the neck portion 85a of the venturi passage 85 and are further mixed while passing into chamber 86 thereby forming a gas-liquid emulsion leaving through outlet 87, as indicated by arrow 88.

This apparatus has the advantage of creating a very great turbulence of the contacting phases, whereby a particularly abrupt temperature drop is produced. In addition, the comparatively small size of this apparatus makes it possible to have it placed very close to the reaction vessel.

Figure 9:
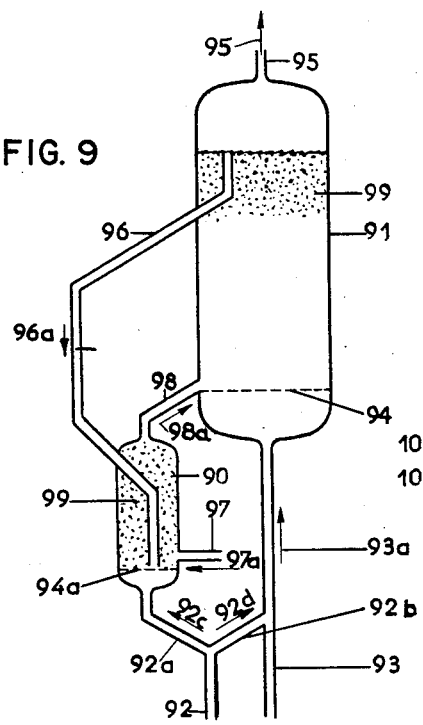
Figure 10:
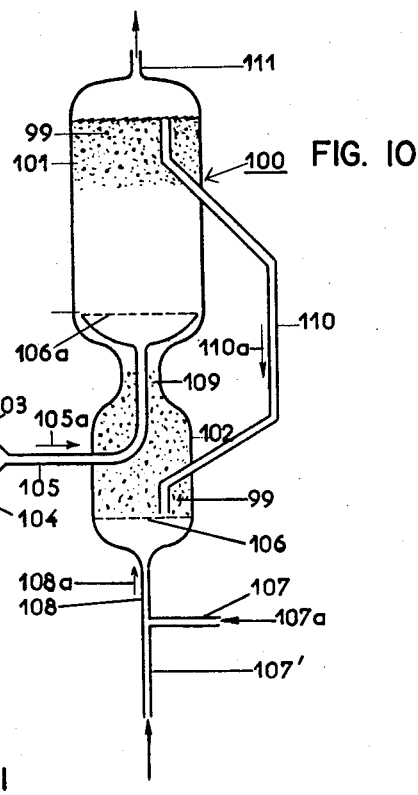

For the aforedescribed catalytic regenerating process the invention provides an apparatus of the type shown in FIGURE 9 or of the type shown in FIGURE 10.

Turning first to FIGURE 9, a re-generation unit 90 is connected with the reaction vessel 91 by the channel 98. The reaction vessel has, in its lower portion, a distribution grid 94 and at its lowermost end, an inlet channel 93. There is provided another channel 92 forming two branches 92a, 92b, the branch 92b communicating with inlet channel 93, the branch 92a communicating with the regeneration unit 90. The latter has another inlet channel 97. A further channel 96 leads from the interior of reaction vessel 91 to the interior of the regeneration unit 90. At its uppermost end the reaction vessel 91 has an outlet channel 95.

Water steam is fed into the reaction vessel 91 through channels 92, 92b, 93, as indicated by arrows 92d, 93a, and 4,4-dimethylmetadioxane is supplied thereto via channel 93, both of which substances pass through distribution grid 94 into the catalyst 99. The finely grained catalyst is maintained in suspension within the reaction vessel 91 by the stream of water steam and 4.4-dimethylmetadioxane in the vapor phase. The gaseous products leave the reaction vessel through outlet channel 95 as indicated by arrow 95a, whereas the catalyst enters into channel 96, travels therein as indicated by arrow 96a and then passes into the re-generation unit 90, in which latter it is suspended by the stream of water steam arriving through channels 92, 92a, and distribution grid 94a, as indicated by arrow 92c. A pre-determined quantity of diluted phosphoric acid, as indicated by arrow 97a, is introduced into the re-generating unit 90 either periodically or, preferably, continuously. The quantity of phosphoric acid is so adapted as to maintain the phosphoric acid content of the catalyst on a constant level. The catalyst is thus re-impregnated and while forming a fluid bed, passes with the steam into the reaction vessel 91 through channel 98, as indicated by arrow 98a.

The detailed construction of the reaction vessel 91 has been omitted in FIGURE 9 for the sake of clarity; it can, of course, comprise all conventional elements or the other described elements, and particularly a cyclone for separating the catalytic particles from the gas stream.

Another type of apparatus for regenerating the catalyst according to the invention is shown in FIGURE 10. The reaction vessel 100 is composed of two portions communicating with each other, a reaction portion 101, an intermediate annular space 109 and a regeneration portion 102. The regeneration unit 102 has an inlet channel 108 communicting with the branches 107 and 107'. A grid 106 is provided in the lower portion of the regeneration unit and a grid 106a is provided in the lower portion of the reaction unit 101. The two units are in communication through the intermediate space 109, and through channel 110. Furthermore, there are provided two inlet channels 103 and 104, uniting to form a channel 105 which is passed into the regeneration unit 102 and then leads directly below grid 106a in the reaction unit 101. The latter unit has an outlet 111 at its uppermost end.

The 4,4-dimethylmetadioxane is fed into the reaction unit 101 through channels 103, 105 and distribution grid 106a (see arrows 103a, 105a) and it is supplied with water steam through channels 104, 105 and grid 106a (see arrows 104a, 105a); the two substances mix already when passing together through channel 105 and are evenly distributed when passing together through the distribution grid 106a. The amount of water steam thus fed into the reaction unit forms only a fraction of the necessary quantity for diluting the reacting substances. Therefore, additional steam, mixed with small quantities of phosphoric acid, introduced through channel 107, as indicated by arrow 107a, is introduced through channel 108 (see arrow 108a). The mixture being evenly distributed through grid 106 thus reaches the catalyst 99 in the regeneration unit 102. It suspends the catalyst and, at the same time, re-impregnates the same with phosphoric acid. The fluid mixture then passes into the reaction unit via the annular space 109. The catalytic particles return to the regeneration unit through channel 110, whereas the gases leave the reaction unit 101 through outlet 111.

Figure 11:
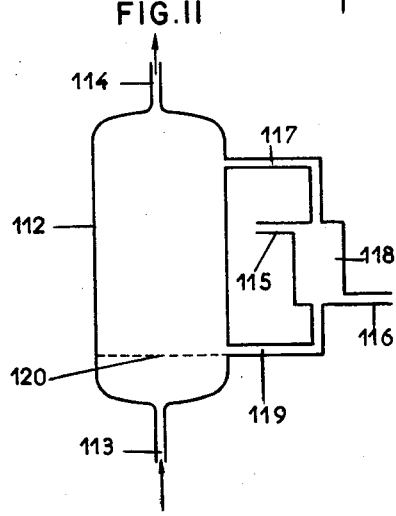

The two types of apparatus shown in FIGURES 9 and 10 thus have in common that a part of the water steam to be used for the reaction in the reaction unit is used for making fluid a portion of the catalyst which has to be impregnated.

Where the catalyst forms a fluid or mobile bed, it is also possible to reimpregnate the catalyst with phosphoric acid outside of the reaction zone and in the absence of the reaction substances. This can be done, for example with the aid of the apparatus shown in FIGURE 11, having an outlet channel 114 in its uppermost portion, and an inlet channel 113 in its lowermost portion, as well as a distribution grid 120 disposed in its lower portion. The regenerating unit 118 communicates with the reaction vessel 112 via an upper channel 117 and a lower channel 119. The regenerating unit 118 also has an inlet channel 116 and an outlet channel 115.

The reaction vessel 112 is supplied with the 4,4-dimethylmetadioxane and water steam through inlet channel 113 and the vapors leave the reaction vessel through outlet channel 114. A fluid catalyst circulates outside of the reaction vessel following the course 117, 118, 119, whereas a mobile catalyst circulates in the reversed direction that is following 119, 118, 117. During this passage the catalyst is brought into contact with small quantities of phosphoric acid which are introduced into the re-generating unit 118 through inlet channel 116. The phosphoric acid is mixed with inert gases or vapors and after having contacted the catalyst leaves through outlet channel 115.

The aforementoined apparatus are particularly useful for regenerating the catalyst by re-impregnation with phosphoric acid. However, they can be easily adapted for use as regenerating units burning the impurities and deposits on the catalyst with such slight modifications well within the reach of any person skilled in the art.

Figure 12:
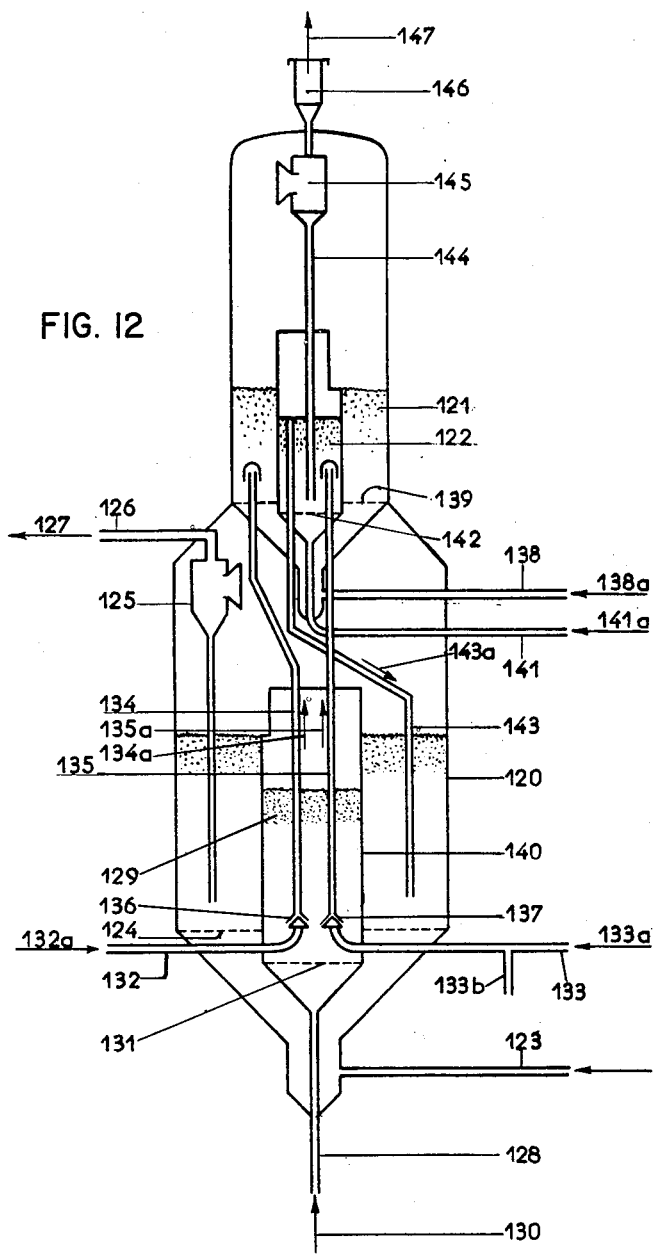

Although the reimpregnation with phosphoric acid can be done separately it will be useful to have an apparatus wherein both regenerating processes can be combined. This is shown in FIGURE 12, wherein the reaction vessel 120 is combined with a calcining furnace 121, and, disposed within the furnace a reimpregnation unit 122. Within the reaction vessel there is disposed an intermediate unit 140 having a distribution grid 131 and an inlet channel 128. Furthermore, there are provided two inlet channels 132 and 133, and in the interior of the intermediate unit 140, injectors 136 and 137 at the end of channels 132 and 133 respectively.

Channel 134 leads into the calcining furnace 121 and channel 135 leads into the reimpregnation unit 122. At its lower end, the reaction vessel 120 has an inlet channel 123 and a distribution grid 124. Within the reaction vessel 120 there is provided a cyclon 125 with an outlet channel 126. The reaction vessel is in communication with the reimpregnation unit 122 via the channel 143. The reimpregnation unit 122 has an inlet channel 141, a distribution grid 142, and a channel 144 connected to the cyclon 145 in the calcining furnace 121, the cyclon being connected with an outlet channel 146. The calcining furnace 121 has an inlet channel 138 and a distribution grid 139.

The reaction vessel 120 is fed with a mixture of 4,4-dimethylmetadioxane and water steam through channel 123 and distributed by grid 124. The gas stream passes through cyclon 125 and leaves the reaction vessel through channel 126 as indicated by arrow 127. A small portion of the catalyst contained in the reaction vessel 120 passes continuously to the intermediate zone (stripping zone) 140 where it is made fluid by the steam arriving through channel 128, as indicated by arrow 130 and distributed by grid 131. The steam takes along the traces of the 4,4-dimethylmetadioxane carried by the catalyst and also leaves through channel 126. The catalyst then passes through channel 134 into the calcining furnace 121. It is moved by a stream of air coming from channel 132 as indicated by arrow 132a, introduced in predetermined dosages by injector 136. In the calcining furnace 121 the catalyst is made fluid and burns with a stream of air being fed thereinto through channel 138 as indicated by arrow 138a and distributed by the annular section of grid 139. The catalyst remains for some time in the calcining furnace 121 and then falls back into the reimpregnation unit 122. A portion of the catalyst in the intermediate zone 140 can be directly fed into the reimpregnation unit 122. This is done through channel 135 by means of water steam which latter is supplied through channel 133 in predetermined dosages by injector 137. This steam contains phosphoric acid supplied through channel 133b. In the reimpregnation unit 122 the catalyst is made fluid by water steam supplied through channel 141 as indicated by arrow 141a and distributed through grid 142. In the reimpregnation unit the reimpregnation is continued and completed which had already started in channel 135. The catalyst which is thus reimpregnated with phosphoric acid returns into the reaction vessel by its proper gravity and through the channel 143 as indicated by arrow 143a. The gases and vapors leave the reimpregnation and calcining zones by passing through channel 144, the cyclon 145 to the outside through an outlet 146 (see arrow 147).

The circulation of the catalyst is controlled by the particular dimensions of injectors 136 and 137. By interrupting circulations through channel 135 the entire catalyst is first calcinated before being reimpregnated. If the rate of flow through channels 134 and 135 is equal it then follows statistically that the catalyst will be reimpregnated twice before undergoing a calcination. By increasing the rate of flow through channel 135 without modifying the rate of flow through channel 134 this ratio can be further modified, so that a reimpregnation is effected more than twice for each calcination.

The afore-described apparatus offers great advantages as it enables a very smooth operation and guarantees a high catalytic activity which also is very constant.

*Example I*

20 grams of glass wool having a specific surface of about 0.1 m.$^2$/gram are immersed into an aqueous solution of phosphoric acid having a concentration of 40% by weight, and are then dried in the open air until there remain only 20 grams of absorbed solution. The catalyst is then dried in a drier at a temperature of 280° C. for about 10 hours. The weight of the dried glass wool is 28 grams, which corresponds to a phosphoric acid content of 28.5%.

Example II 4.4-dimethylmetadioxane and water are injected together into a vaporizer-preheater, each at a constant rate of 0.06 liters per hour. The mixture of vapors is heated to 280° C. and brought into a reaction vessel maintained at the same temperature. It is passed through 28 grams of glass wool impregnated with phosphoric acid as described in Example I. The catalyst has a volume of 93.3 cm.³. The spatial speed of the vapors is, with respect to each of the initial liquids, 0.64 liters/hour/liter of catalyst.

The vapors obtained from the reaction vessel are condensed and then neutralized by adding sodium hydroxide. They are then fractionated by distillation. The non-converted 4.4-dimethylmetadioxane is re-entered into the reaction vessel.

After 17 hours, 549 grams 4.4-dimethylmetadioxane have been consumed. As a yield there are obtained 292.5 grams hydrocarbon and 134 grams of formaldehyde in an aqueous solution, as well as 36 grams of high-molecular products containing primarily 3-methylbutane-1.3-diol.

The chromatographic analysis of a cut of the hydrocarbons shows that they are composed of isoprene and a small quantity of isobutene. By fractional distillation 285.5 grams of isoprene and 7 grams of isobutene are obtained.

The activity of the catalyst has only slightly decreased, its weight having increased by 6 grams and its final activity being 95% of its initial activity. The ratio of the final and the initial rates of conversion are thus 95:100.

The catalyst can be used for a considerably longer period than 17 hours; it is capable of effecting a conversion of 4000 grams of 4.4-dimethylmetadioxane, which is more than 140 times its own weight.

From the above mentioned figures, the following molar yields are obtained:

| | Percent |
|---|---|
| Isoprene | 88.7 |
| Isobutene | 2.64 |

The selectivity of the catalyst is thus 97.1%.

The yield of formaldehyde can be expressed in various ways, since the main reactions produce one mole (formation of isoprene) or two moles (formation of isobutene) of formaldehyde, or no mole at all (formation of pentene). The total yield ($P_1$) of formaldehyde, defined as the molecular ratio between the produced formaldehyde and the converted 4.4-dimethylmetadioxane, is 93.85%. This yield of formaldehyde can best be expressed by the following formula indicating the molar quantities of each substance:

$$P_2 = 100 \times T \times \frac{\text{actual yield of formaldehyde}}{\text{theoretical yield of formaldehyde}}$$

In this formula T represents the rate of conversion of 4.4-dimethylmetadioxane into formaldehyde, i.e. the molecular ratio between the reacting 4.4-dimethylmetadioxane resulting in the production of formaldehyde, and the converted 4.4-dimethylmetadioxane, which is equal to $$T = \frac{\text{isobutene} + \text{isoprene}}{\text{converted 4.4-dimethylmetadioxane}}$$

the losses of isoprene and isobutene having been neglected.

Under the same conditions the theoretical yield of formaldehyde is equal to (2 isobutene+isoprene), wherefrom we obtain:

$$P_2 = 100 \times \frac{\text{isobutene} + \text{isoprene}}{\text{converted 4.4-dimethylmetadioxane}} \times \frac{\text{obtained formaldehyde}}{(2 \text{ isobutene} + \text{isoprene})}$$

In this example $P_2$ is equal to 91.2%.

Example III

Example I is repeated with an aqueous solution of phosphoric acid having a concentration of 10% by weight. The final weight of the dried catalyst is 21.2 g., which corresponds to a phosphoric acid content of 5.7%.

Example IV

Example II is repeated with 28 g. of the catalyst obtained in Example III.

The results are as follows:

Conversion rate: 17%
Molar yields substantially as in Example II
Deposits weaker than in Example II

Example V

Example I is repeated with an aqueous solution of phosphoric acid having a concentration of 60% by weight. The final weight of the dried catalyst is 42.5 g., which corresponds to a phosphoric acid content of 53%.

Example VI

Example II is repeated with 28 g. of the catalyst obtained in Example V.

The results are as follows:

| | Percent |
|---|---|
| Conversion rate | 71 |
| Molar yields: | |
| Isoprene | 82 |
| Formaldehyde ($P_1$) | 89 |

Deposits are more important than according to Example II.

What we claim is:

1. A process for producing isoprene and formaldehyde comprising the step of passing, at a temperature of from 200 to 300° C., a mixture of 4.4-dimethylmetadioxane with an inert diluent in the vapor phase through a catalyst consisting of a fibrous silicate having a specific surface not exceeding 100 m.²/gram, impregnated with phosphoric acid to such an extent that the acid content of the catalyst is kept within the range of from 5 to 60% by weight.

2. A process for producing isoprene and formaldehyde comprising the step of passing, at a temperature of from 200 to 300° C., a mixture of 4.4-dimethylmetadioxane with an inert diluent in the vapor phase through a catalyst consisting of a fibrous silicate having a specific surface of less than 20 m.²/gram, impregnated with phosphoric acid to such an extent that the acid content of the catalyst is kept within the range of from 5 to 60% by weight.

3. A process for producing isoprene and formaldehyde comprising the step of passing, at a temperature of from 200 to 300° C., a mixture of 4.4-dimethylmetadioxane with an inert diluent in the vapor phase through a catalyst consisting of asbestos impregnated with phosphoric acid to such an extent that the acid content of the catalyst is kept within the range of from 5 to 60% by weight.

4. A process for producing isoprene and formaldehyde comprising the step of passing, at a temperature of from 200 to 300° C., a mixture of 4.4-dimethylmetadioxane with an inert diluent in the vapor phase through a catalyst consisting of synthetic glass wool having a specific surface not exceeding 100 m.²/gram, impregnated with phosphoric acid to such an extent that the acid content of the catalyst is kept within the range of from 5 to 60% by weight.

References Cited in the file of this patent

UNITED STATES PATENTS

| | | |
|---|---|---|
| 1,841,055 | Reppe et al. | Jan. 12, 1932 |
| 2,218,640 | Friedrichsen et al. | Oct. 22, 1940 |
| 2,241,777 | Friedrichsen | May 13, 1941 |
| 2,361,539 | Friedrichsen | Oct. 31, 1941 |

FOREIGN PATENTS

| | | |
|---|---|---|
| 468,654 | Italy | Jan. 29, 1952 |